(12) United States Patent
Kojs

(10) Patent No.: US 6,269,740 B2
(45) Date of Patent: Aug. 7, 2001

(54) SPIRAL MEAT SLICING APPARATUS

(75) Inventor: Jozef Kojs, Palos Hills, IL (US)

(73) Assignee: Peer Foods, Inc., Chicago, IL (US)

( * ) Notice: Subject to any disclaimer, the term of this patent is extended or adjusted under 35 U.S.C. 154(b) by 0 days.

(21) Appl. No.: 09/761,453

(22) Filed: Jan. 16, 2001

Related U.S. Application Data

(62) Division of application No. 09/455,896, filed on Dec. 6, 1999, now Pat. No. 6,200,621.

(51) Int. Cl.$^7$ .................................................. B26D 3/00
(52) U.S. Cl. ................................. 99/537; 99/538; 99/593; 99/594; 99/597
(58) Field of Search ............................ 99/537, 538, 541, 99/593, 594, 597, 598, 599; 83/483, 488, 932; 426/513, 518

(56) References Cited

U.S. PATENT DOCUMENTS

| | | | |
|---|---|---|---|
| Re. 35,374 | * 11/1996 | Logan, Jr. ............................ | 426/641 |
| 3,153,436 | * 10/1964 | Chesley ................................ | 99/538 |
| 4,332,190 | * 6/1982 | Mart .................................... | 99/538 |
| 4,386,560 | * 6/1983 | Ditty ................................... | 99/538 |
| 4,412,483 | * 11/1983 | Hoegh .................................. | 99/538 |
| 4,441,411 | * 4/1984 | Mullins, Jr. ......................... | 99/538 |

* cited by examiner

*Primary Examiner*—George C. Yeung
(74) *Attorney, Agent, or Firm*—Nawrocki, Rooney & Sivertson, P.A.

(57) ABSTRACT

A spiral meat slicing apparatus and method having a lower meat support assembly including a rotatively driven lower shaft and an upstanding lower spike for receiving the major longitudinal end of a cut of boneless meat, the lower spike being carried by the lower shaft. An upper meat support assembly is provided and includes a rotatively driven, vertically adjustable upper shaft and an upper spike for receiving the minor longitudinal end of a cut of boneless meat, the upper spike being carried by the upper shaft. The upper spike is in coaxial alignment with the lower upstanding spike to thereby define an axis of rotation for a cut of boneless meat supported therebetween. A vertically indexable knife is positioned relative to the axis of rotation so as to enable a continuous spiral cut to be made therein. The shafts of the meat support assemblies are synchronously driven such that the major and minor longitudinal ends of a cut of boneless meat are steadily and uniformly driven to thereby produce a clean, uniform spiral cut between the longitudinal ends thereof during engagement of the vertically indexable knife.

6 Claims, 2 Drawing Sheets

SPIRAL MEAT SLICING APPARATUS

This application is a divisional application of application Ser. No. 09/455,896, filed on Dec. 6, 1999, now U.S. Pat. No. 6,200,621.

TECHNICAL FIELD

The present invention relates to an apparatus and method for effecting a neat, clean and continuous spiral slice in a cut of boneless meat.

BACKGROUND OF INVENTION

Spiral meat slicers are known to generally include a reciprocating knife structure and apparatus for mounting the meat, for rotating the meat, for tensioning the knife blade against the meat, and for moving the knife structure upwardly so as to longitudinally traverse the rotating meat.

Chesley, U.S. Pat. No. 3,153,436, discloses a slicer for boned (i.e., bone-in) or boneless meat products having a reciprocating knife blade which is pivotably mounted on an indexable carriage for engagement with the rotating meat so as to produce a spiral cut therein. Meat rotation, knife blade oscillation, and knife blade indexing are accomplished using a variety of shafts, gears, etc. coupled to a single motor. An upper axial adjustable support and a lower rotatably driven support are provided to hold the meat. The upper axial adjustable support includes a rotatable prong structure provided on the lower end of a rod. This structure holds the upper end of the meat for indirect or passive rotation (i.e., the upper support rotates in response to the rotatively driven meat positioned on the rotatively driven lower support). The lower rotatably driven support includes a power driven shaft equipped with a disc having an upwardly projecting center portion and three upwardly projecting circumferentially spaced prongs or tines. The power driven shaft is linked to the single motor by a transmission assembly. When it is desired to slice a boneless meat product, the upper axially adjustable support is outfitted with an accessory spit structure having a telescoping rod and a disc equipped with openings to receive the prongs of the upper support structure. In operation, the telescoping rod of the accessory spit structure is inserted into the boneless meat product so that it longitudinally traverses the boneless meat product, and thereby provides an axis of rotation, and more importantly a structural support running throughout its length to make spiral slicing possible. The spitted and fully supported meat is then mounted on the slicer for spiral slicing as described in the case of a bone-in product.

As noted in Ditty, U.S. Pat. No. 4,386,560, the Chesley apparatus and method have a number of disadvantages. Various parts, particularly the structures associated with the knife holder, oscillator, and carriage are subject to rapid wear due to excessive vibration of the reciprocating knife structure. Furthermore, a variety of adjustment problems have been found to exist in connection with operating and maintaining such spiral slicers, problems which result in a non-uniform, mis-cut product.

Ditty generally addresses issues of durability, serviceability and the variety of adjustment problems associated with meat rotation, knife oscillation, and blade indexing. For instance, in contradistinction to Chesley, Ditty provides an improved reciprocating knife structure which includes, among other things, a dedicated electric motor for oscillating the cutting blade thereof. Meat rotation and blade indexing are achieved using a separate electric motor for driving individual (i.e., dedicated) transmissions for the aforementioned separate functions. Ditty, as Chesley, mounts a cut of meat for spiral slicing between an upper axially adjustable pronged support and a lower rotatively driven pronged support. Both Ditty and Chesley require a meat product having a natural bone or a bone substitute (i.e., Chesley's accessory skewer) to provide an axis, and more importantly to support the meat during slicing so as to thereby repeatedly produce consistent spiral cuts of uniform thickness in a boned or boneless meat product.

Logan Jr., U.S. Pat. No. Re. 35,374, has particularly addressed the shortcomings of a particular style of spiral meat slicing apparatus, namely those having hydraulic vertical drive cylinders, and has emphasized the importance of consistency in vertical positioning in spiral meat slicing operations (i.e., has identified as being problematic the interrelatedness or interdependency of vertical indexing, meat rotation and knife oscillation). In furtherance of these objectives, Logan Jr. provides separate motors for: driving a lower rotatively driven meat support; powering the rotating cutting blade of the slicer assembly; and, powering the linear indexing assembly used to move the slicer blade. When it is desired to slice a boneless meat product, a meat spit is inserted throughout the length of a boneless cut of meat. The opposing ends of the deployed meat spit which extend beyond the longitudinal ends of the meat are received and held by the upper and lower supports, with the boneless meat product being thereby completely supported throughout its length to make spiral slicing possible.

Although the foregoing patents have to some extent addressed consistency of cut and mis-cut product issues, these issues nonetheless remain and are of a greater concern to producers of spirally sliced meat products, particularly as the demand for spirally sliced boneless meat cuts, such as ham and turkey, has risen with increased popularity. Increasing the production of spirally sliced meat while maintaining a consistent cut thickness is most desirable, with producers evermore challenged to reduce the unit cost of spirally sliced meat products produced so as to increase, or at a minimum maintain market share. Minimization of mis-cuts and maximization of throughput is most desirable.

Heretofore, rotation of meat products for spiral slicing occurs from the direct rotation of a lower meat support or turntable. As the upper meat support is responsively driven by the rotating meat (i.e., indirectly when compared to the lower support), there is a tendency to cause twisting of the spiral slices within the meat itself, thus leading to mis-cut (i.e., wasted) product. There thus exists a need to eliminate the axial twisting of the meat product during spiral slicing, especially when slicing boneless meat products.

Furthermore, the foregoing apparatus and methods require a great deal of operator attention and manipulation to insure a minimal amount of mis-cut product, particularly when slicing a boneless product. For instance, operator loading and unloading times associated with boneless meat products typically exceed those of bone-in meat products as a skewer (i.e., a central bone substitute) is typically inserted in one end of and through the boneless meat product prior to mounting the meat for slicing. Depending upon the quality (i.e., thickness) and quantity (i.e., start and end point) of the cut, skewer removal can be especially time consuming, as operator care and attention is necessary so as to maintain the overall physical integrity of the spirally sliced product. Additionally, skewers can only be centered on one end of a meat product slated for spiral slicing, thus leading to a skewed axis of rotation for the meat product which often contributes to mis-cuts.

Lastly, apparatus heretofore known leave a not insignificant quantity of boneless meat product uncut, particularly about the base or bottom portion of the meat.

SUMMARY OF THE INVENTION

The spiral meat slicing apparatus of the subject invention provides means for mounting and gripping the boneless meat product for spiral slicing wherein the boneless meat product is supported or held only at its opposing ends, the opposing ends being synchronously driven so as to reliably and consistently rotate the boneless meat product throughout its length for spiral slicing. The spiral meat slicing apparatus of the present invention includes a lower meat support assembly comprising a rotatively driven lower shaft and an upstanding lower spike for receiving the major longitudinal end of a cut of boneless meat product, the lower spike being carried by the lower shaft. An upper meat support assembly comprising a rotatively driven, vertically adjustable upper shaft and an upper spike for receiving the minor longitudinal end of a cut of boneless meat product is also provided, the upper spike being carried by the vertically adjustable upper shaft. The upper spike is in coaxial alignment with the lower upstanding spike to thereby define an axis of rotation for a cut of boneless meat product supported at its opposing ends between the lower and the upper meat support assemblies. A vertically indexable knife is positioned relative to the axis of rotation of the cut of boneless meat product so as to enable a continuous spiral cut to be made therein. Apparatus for vertically indexing the knife relative to a cut of boneless meat product are also provided, as is apparatus for imparting a cutting motion to the knife and for synchronously rotating the shafts of the meat support assemblies. The major and minor longitudinal ends of a cut of boneless meat product are steadily and uniformly driven to thereby produce a clean, uniform spiral cut between the longitudinal ends of a cut of boneless meat during engagement of the vertically indexable knife.

More specific features and advantages will become apparent with reference to the DETAILED DESCRIPTION OF THE INVENTION, appended claims, and the accompanying drawing figures.

DETAILED DESCRIPTION OF THE INVENTION

The subject invention is an improvement over the apparatus and methods disclosed in U.S. Pat. No. 3,153,436 (Chesley), 4,386,560 U.S. Pat. No. (Ditty) and U.S. Pat. No. Re. 35,374 (Logan Jr.), with particular emphasis on mounting and rotating the boneless meat product. The disclosure of those patents are expressly incorporated herein by reference.

Figure 1:
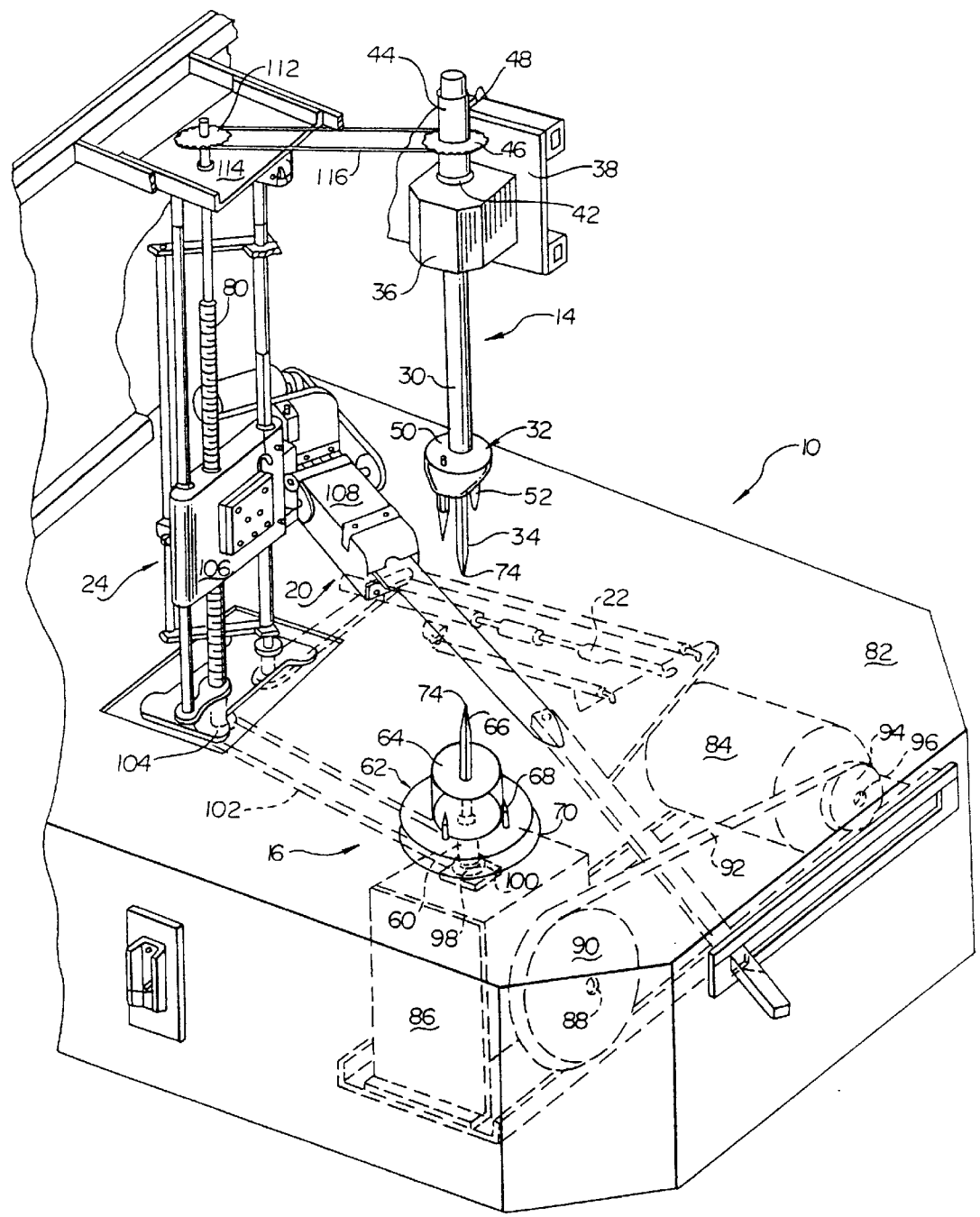
FIG. 1 is a perspective view of the improved spiral meat slicer according to the present invention, with parts broken away to assist in clarifying its construction.

Referring to FIG. 1, there is shown a spiral meat slicer 10 including upper 14 and lower 16 meat support assemblies, a reciprocating knife structure 20, means for tensioning the knife blade against the meat 22, and means for moving the knife structure upwardly so as to longitudinally traverse the rotating meat 24. The reciprocating knife structure 20, means for tensioning the knife blade against the meat 22, and means for moving the knife structure 24 are as described and disclosed in Ditty.

Figure 2:
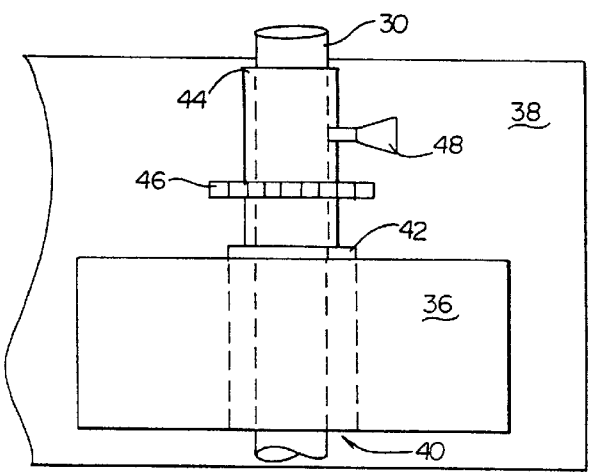
FIG. 2 is an elevational view of the upper meat support assembly of the present invention.
Figure 2A:
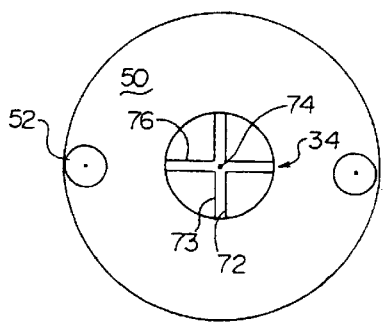
FIG. 2A is a plan view of the upper meat support assembly of the present invention.

Referring now to FIGS. 1, 2 & 2A, the upper meat support assembly 14 comprises a rotatively driven, vertically adjustable upper shaft or spindle 30, an upper prong structure 32, and an upper spike 34, the upper spike and prong structure receiving and thereby supporting an end of a boneless cut of meat for spiral slicing. The upper spike 34 is preferably replaceably carried by the lower end of the upper shaft 30, as by a threaded interface, set screw or other known means. However, the upper spike 34 may be a unitary part of the prong structure 32.

A bracket 36 is mounted on a structural member 38 of the meat slicing apparatus 10 as shown in FIG. 1. The bracket 36 has an opening 40 therethrough and a bushing 42 therein for slideably receiving the upper shaft 30 of the upper support assembly 14. A drive spindle 44 (i.e., a hollow shaft) equipped with a sprocket 46 is rotatively carried by the bracket 36 via a retaining ring (not shown) in axial alignment with the opening 40 of the bracket 36. The drive spindle 44, as the bracket opening 40 (See FIG. 2), slideably receives the upper shaft 30 of the upper support assembly 14 which is securable in adjusted positions relative to the drive spindle 44 by means of a set screw 48 threadingly received in the drive spindle 44 for such purpose. The aforementioned components and configuration permit vertical adjustability of the directly driven upper shaft of the upper meat support assembly.

The upper prong structure 32 of the upper support assembly 14 is generally received upon the upper shaft 30 for rotation therewith for cooperative engagement with an end of the boneless cut of meat. The upper prong structure 32 preferably includes a body 50 equipped with a plurality of prongs or tines 52, which threadedly or otherwise engage the underside of the body 50 as is well known in the art. Preferably the spike carrying upper shaft 30 passes through the body 50 of the upper prong structure 32, with the spike 34 being substantially centered among the plural prongs 52 and extending from the body 50 of the prong structure 32 a greater distance than the prongs 52 extend from the body 50 of the prong structure 32.

The prongs 52 are preferably cylindrical elements having conical or otherwise pointed tips and are physically distinguishable from the spikes as they are significantly shorter in length, and are typically less substantial in their cross sectional area. Functionally the prongs are best thought of as supplemental meat holders, stabilizers or guides whereas the spikes are designed to more fully penetrate and grip the boneless meat product and impart to the entirety of the boneless meat product the steady and uniform rotation of the synchronously (with the lower shaft, described below) rotating upper shaft. With this particular upper support structure arrangement, the spike 34 (described more fully below) functions as a primary central grip and rotational guide for one end of the boneless meat product while the plural prongs 52 are secondary or supplemental holders which aid in the physical support of the boneless cut of meat. Alternate prong structure arrangements, even elimination of such prongs, are contemplated without deviating from the critical consideration, namely an active, powered rotation of a primary upper support spike synchronously with an active, powered rotation of a primary lower support spike.

Figure 3A:
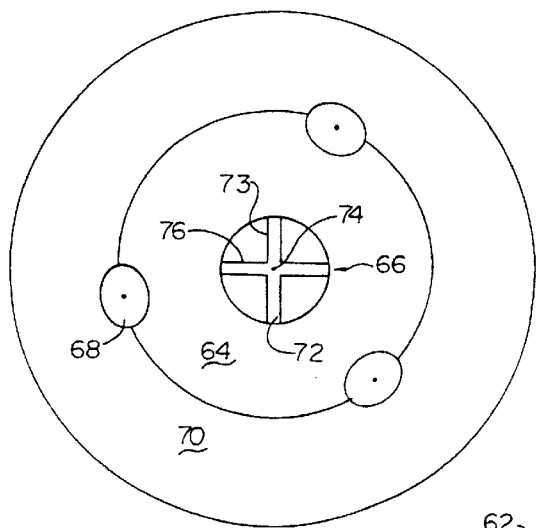
FIG. 3A is a plan view of the lower meat support assembly of the present invention.
Figure 3:
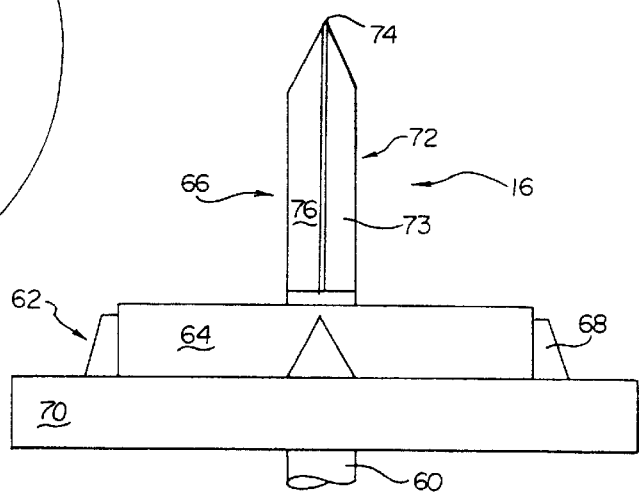
FIG. 3 is an elevational view of the lower meat support assembly of the present invention.

Referring now to FIGS. 1, 3 & 3A, the lower meat support assembly 16 preferably includes a rotatively power driven lower shaft 60, a lower prong structure 62, a meat platform or base 64 which provides a sturdy meat support surface, and an upstanding lower spike 66—preferably carried by the upwardly extending lower shaft as in the case of the upper spike arrangement—for substantially receiving and thereby supporting an end of a boneless cut of meat for spiral slicing. The upper spike is preferably in coaxial alignment with the lower upstanding spike to thereby define an axis of rotation for a cut of boneless meat product supported at its opposing ends between the lower and the upper meat support assemblies.

The lower prong structure 62 includes a plurality of upstanding prongs 68 carried by a rotatable turntable 70. The meat platform 68 rests upon the turntable 70, within a perimeter defined by the prongs 68 of the lower meat support assembly 16, so as to elevate the boneless meat product relative to the turntable. By this adaptation of the turntable, the prongs of the lower meat assembly are not implicated in holding the boneless meat product. However, raising the boneless meat product off the surface of the turntable permits a more thorough and complete cut at the base of the boneless meat product. In the spiral slicing of boneless meat products (e.g., a ham), it is important to maximize the extent of the spiral slice throughout the length of such product, whereas in a bone-in product, the aitch or H-bone present at the butt end of the ham obviates any need to start or end a cut near that end of such a product.

Both the upper 34 and lower 66 spikes are especially configured to grip and support the boneless meat product from the opposing ends thereof. In addition to supporting the mounted meat, the directly rotatively driven spikes must transfer rotational energy to and through the boneless meat product so as to achieve a steady and consistent meat rotation prior to and during knife engagement to thereby produce a clean, uniform spiral cut between the longitudinal ends of the meat. Uniformly driving the opposing ends of the boneless meat product in synchronous rotation avoids the twisting of the spiral slices within the meat itself, as is the case when only one meat support assembly (i.e., the lower support assembly) is directly driven. Mis-cuts and the resulting waste of product is thereby reduced.

The spikes 34 & 66 comprise orthogonally intersecting blades 72 which provide a cruciform shape. Each of the blades 72 tapers toward their free end so as to form a point 74. The two intersecting blades 72 effectively form four vertical spike segments 73 and eight spike faces 76. This spike configuration greatly contributes to the desirable synchronous rotation of the opposing ends of the boneless meat product (i.e., the steady and uniform rotation of the entire cut of meat about the axis of rotation defined by the coaxial alignment of the upper and lower spikes) as the spike segments radially project at 90 degree intervals from the axis of rotation so as to aid in gripping the meat.

The spikes are preferably dimensioned to be from about one fourth to one third the longitudinal dimension of the boneless cut of meat, with about a three inch spike length suitable to penetrate the opposing ends of the boneless meat product and thereby produce the desired support and gripping effect in furtherance of meat rotation. Unlike the skewers or other bone substitutes of the prior art which are typically driven entirely through a boneless cut of meat, sufficient rigidity and structural support is imparted to the boneless meat product using the cruciform spikes which penetrate only the opposing ends thereof.

As is the case with hams, the cut of meat mounted for spiral slicing is typically asymmetrical, having major (i.e., a butt or bulbous end) and minor (i.e., a shank or tapered end) longitudinal ends spaced apart by a meat body. It is preferable, but not necessary, that the meat be mounted such that the lower meat support supports the meat at the major longitudinal end so as to provide a lower center of mass for the meat when rotated for slicing. This mounting approach also generally facilitates loading and unloading the meat from the slicer and contributes to a neater and cleaner cut for the product. As noted hereinabove, the upper and lower spikes preferably penetrate only the longitudinal ends of the meat and need not link or connect the opposing ends, as is the case with skewering.

In the process of loading the meat in the slicer, the butt end of the ham is inserted on the lower cruciform spike 66 to a position where the lower (i.e., butt) end of the ham rests on the meat support structure 64. The ham is generally positioned such that its greatest dimension (i.e., longitudinal dimension) is substantially vertical. After the ham has been positioned on its lower support assembly 16, the upper shaft 30 of the upper assembly 14 is adjustably lowered through the drive spindle 44 and the bracket opening 40 to insert the upper spike 34 into the shank end of the ham. Finally the upper shaft 30 is secured to the drive spindle 44 via the set screw 48. The time consuming steps associated with skewering and unskewering a boneless meat product in preparation for spiral slicing using heretofore known methods and apparatus are eliminated, thus decreasing operator assistance and thereby providing quicker more efficient meat processing.

FIG. 1 shows a power drive for setting in motion the shaft 60 of the lower meat support assembly 16, the vertical worm 80 of the moving knife blade structure 24, and the shaft 30 of the upper meat support assembly 14 mounted in a housing 82. Contained within the housing 82 are an electrical motor 84 and a gear box 86. A shaft 88 extends exteriorly of the gear box 86 and has mounted on its exterior end a pulley wheel 90. The pulley wheel 90 is connected by a belt 92 to a pulley 94 which is attached to the output shaft 96 of the motor 84. The lower shaft 60 is connected to output 98 of the gear box 86 and is rotatively driven thereby.

The lower shaft 60 of the lower support assembly 16 carries a sprocket 100 (corresponding to sprocket 46 of upper support assembly 14) which is connected, via a chain 102, to a sprocket 104 carried by the lower end of the vertical worm 80. The upper end of the vertical worm 80 likewise carries a sprocket 112, exterior to the frame panel 114, which is connected, via a chain 116, to the sprocket 46 carried by the drive shaft 44 of the upper meat support assembly 14. A chain guard (not illustrated) typically houses the moving parts of this linkage. When the worm 80 is engaged, as when it is desired to raise the carriage 106 to which the knife blade structure 108 is mounted, it will be directly driven by the lower shaft 60 of the lower support assembly 16 so as to cooperate with a worm gear provided within the carriage 106, thereby raising the knife blade structure 108. At that same time, the upper shaft 30 will be driven synchronously with the lower shaft such that meat mounted for spiral slicing will be driven at both the butt and shank ends about an axis defined by the spikes 34 and 66.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A spiral meat slicer for forming a continuous spiral slice in a cut of boneless meat having major and minor longitudinal ends, comprising, (a) a lower meat support assembly comprising a rotatively driven lower shaft and an upstanding lower spike for receiving the major longitudinal end of a cut of boneless meat, said lower spike being carried by said lower shaft;

(b) an upper meat support assembly comprising a rotatively driven, vertically adjustable upper shaft and an upper spike for receiving the minor longitudinal end of a cut of boneless meat, said upper spike being carried by said vertically adjustable upper shaft, said upper spike being in coaxial alignment with said lower upstanding spike thereby defining an axis of rotation for a cut of boneless meat supported between said lower and said upper meat support assemblies;

(c) a vertically indexable knife for slicing a cut of boneless meat, said knife positioned relative to said axis of rotation to enable a continuous spiral cut to be made therein;

(d) means for vertically indexing said vertically indexable knife relative to a cut of boneless meat;

(e) means for imparting a cutting motion to said knife; and (f) means for synchronously rotating the shafts of the meat support assemblies such that the major and minor longitudinal ends of a cut of boneless meat are steadily and uniformly driven by said upper and lower spikes so as to thereby produce a clean, uniform spiral cut between the longitudinal ends of a cut of boneless meat during engagement of said vertically indexable knife therewith.

2. The spiral meat slicer of claim 1 wherein said upper and lower spikes comprise orthogonally intersecting pointed blades.

3. The spiral meat slicer of claim 1 wherein said upper and lower spikes have a cruciform shape.

4. The spiral meat slicer of claim 1 wherein said lower meat support assembly further comprises a turntable, said turntable being connected to said rotatively driven lower shaft for rotation therewith.

5. The spiral meat slicer of claim 4 wherein said lower meat support assembly further comprises a meat platform for elevating the cut of boneless meat above said turntable.

6. A spiral meat slicer for forming a continuous spiral slice in a cut of boneless meat having major and minor longitudinal ends, comprising, (a) a lower meat support assembly comprising a rotatively driven lower shaft, an upstanding lower spike for receiving the major longitudinal end of a cut of boneless meat, a turntable connected to said rotatively driven lower shaft for rotation therewith, and a meat platform for elevating the cut of boneless meat above said turntable, said lower spike being carried by said lower shaft;

(b) an upper meat support assembly comprising a rotatively driven, vertically adjustable upper shaft and an upper spike for receiving the minor longitudinal end of a cut of boneless meat, said upper spike being carried by said vertically adjustable upper shaft, said upper spike being in coaxial alignment with said lower upstanding spike thereby defining an axis of rotation for a cut of boneless meat supported between said lower and said upper meat support assemblies, said upper and lower spikes include orthogonally intersecting pointed blades and have a cruciform shape;

(c) a vertically indexable knife for slicing a cut of boneless meat, said knife position relative to said axis of rotation to enable a continuous spiral cut to be made therein;

(d) means for vertically indexing said vertically indexable knife relative to a cut of boneless meat;

(e) means for imparting a cutting motion to said knife; and (f) means for synchronously rotating the shafts of the meat support assemblies such that the major and minor longitudinal ends of a cut of boneless meat are steadily and uniformly driven by said upper and lower spikes so as to thereby produce a clean, uniform spiral cut between the longitudinal ends of a cut of boneless meat during engagement of said vertically indexable knife therewith.

* * * * *